(12) United States Patent
Shi et al.

(10) Patent No.: US 7,804,922 B2
(45) Date of Patent: Sep. 28, 2010

(54) SYSTEM AND METHOD FOR ADJACENT CHANNEL POWER DETECTION AND DYNAMIC BANDWIDTH FILTER CONTROL

(75) Inventors: Ying Shi, Coralville, IA (US); James P. Young, Cedar Rapids, IA (US)

(73) Assignee: Skyworks Solutions, Inc., Woburn, MA (US)

( * ) Notice: Subject to any disclaimer, the term of this patent is extended or adjusted under 35 U.S.C. 154(b) by 843 days.

(21) Appl. No.: 11/681,211

(22) Filed: Mar. 2, 2007

(65) Prior Publication Data

US 2008/0214134 A1   Sep. 4, 2008

(51) Int. Cl.
*H04B 14/06* (2006.01)
(52) U.S. Cl. .............. 375/350; 375/260; 375/316; 375/346; 455/339; 455/296; 455/63.1
(58) Field of Classification Search .............. 455/295; 375/260
See application file for complete search history.

(56) References Cited

U.S. PATENT DOCUMENTS

| | | | | |
|---|---|---|---|---|
| 3,794,922 A | * | 2/1974 | Osborn et al. ............... 725/114 |
| 4,135,590 A | * | 1/1979 | Gaulder ..................... 381/94.3 |
| 4,137,510 A | * | 1/1979 | Iwahara ...................... 333/132 |
| 4,192,970 A | * | 3/1980 | Kahn .......................... 381/15 |
| 4,517,519 A | * | 5/1985 | Mukaiyama ................ 329/303 |
| 4,709,270 A | * | 11/1987 | Mehrgardt .................. 348/726 |
| 5,113,068 A | * | 5/1992 | Burke, Jr. ................ 250/214 B |
| 5,184,096 A | * | 2/1993 | Wakino et al. .............. 333/175 |
| 5,208,688 A | * | 5/1993 | Fergason et al. ............... 349/14 |
| 5,287,388 A | * | 2/1994 | Ogura et al. ................. 375/344 |
| 5,812,604 A | * | 9/1998 | Herbst et al. ................. 375/308 |
| 5,974,098 A | * | 10/1999 | Tsuda ......................... 375/340 |
| 6,047,171 A | * | 4/2000 | Khayrallah et al. .......... 455/266 |
| 6,052,701 A | * | 4/2000 | Koslov et al. ............... 708/313 |
| 6,094,564 A | * | 7/2000 | Tomiya et al. ................. 455/73 |
| 6,239,637 B1 | * | 5/2001 | Williamson ................. 327/170 |
| 6,374,094 B1 | * | 4/2002 | Zappala ................... 455/188.1 |
| 6,631,268 B1 | * | 10/2003 | Lilja .......................... 455/450 |
| 6,708,024 B1 | * | 3/2004 | Yip ........................... 455/226.4 |
| 6,960,956 B2 | * | 11/2005 | Pehlke et al. ................ 330/127 |
| 7,103,316 B1 | * | 9/2006 | Hall ............................ 455/63.1 |
| 7,120,579 B1 | * | 10/2006 | Licht .......................... 704/225 |
| 7,130,602 B2 | * | 10/2006 | Ciccarelli ................ 455/240.1 |
| 7,162,271 B2 | * | 1/2007 | Kermalli ..................... 455/561 |

(Continued)

FOREIGN PATENT DOCUMENTS

JP   2002-194736   8/1990

(Continued)

*Primary Examiner*—Chieh M Fan
*Assistant Examiner*—Santiago Garcia
(74) *Attorney, Agent, or Firm*—Smith Frohwein Tempel Greenlee Blaha LLC; Michael J. Tempel

(57) ABSTRACT

A system for detecting and minimizing interference in a radio receiver includes a plurality of bandpass filters having different response characteristics, a power detector configured to compare a power output of a first bandpass filter and a second bandpass filter, and logic to cascade a third bandpass filter when the difference in power output between the power output of the first bandpass filter and the power output of the second bandpass filter exceeds a threshold amount.

21 Claims, 8 Drawing Sheets

U.S. PATENT DOCUMENTS

| | | | |
|---|---|---|---|
| 7,254,325 B2* | 8/2007 | Hoshida | 398/25 |
| 7,308,046 B1* | 12/2007 | Studenberg, Jr. | 375/320 |
| 7,343,142 B2* | 3/2008 | Cowley et al. | 455/180.3 |
| 7,486,939 B2* | 2/2009 | Porco et al. | 455/114.3 |
| 7,512,392 B2* | 3/2009 | Millard et al. | 455/266 |
| 7,539,470 B2* | 5/2009 | Kim et al. | 455/130 |
| 7,577,211 B2* | 8/2009 | Braithwaite | 375/296 |
| 7,583,936 B2* | 9/2009 | Kovacs et al. | 455/78 |
| 2002/0067526 A1* | 6/2002 | Park et al. | 359/127 |
| 2002/0094791 A1* | 7/2002 | Pehlke et al. | 455/115 |
| 2004/0224634 A1* | 11/2004 | Kim | 455/13.4 |
| 2004/0229590 A1* | 11/2004 | Kubo et al. | 455/307 |
| 2005/0042994 A1 | 2/2005 | Otaka | |
| 2005/0190857 A1* | 9/2005 | Braithwaite | 375/296 |
| 2006/0035620 A1* | 2/2006 | Millard et al. | 455/339 |
| 2006/0182072 A1* | 8/2006 | Ransome et al. | 370/338 |
| 2007/0110198 A1* | 5/2007 | Skarby et al. | 375/349 |
| 2007/0165755 A1* | 7/2007 | Jong | 375/346 |
| 2008/0160920 A1* | 7/2008 | Tsui et al. | 455/67.13 |
| 2008/0212966 A1* | 9/2008 | Costantini et al. | 398/79 |
| 2008/0214134 A1* | 9/2008 | Shi et al. | 455/295 |
| 2008/0260081 A1* | 10/2008 | Yang | 375/349 |
| 2008/0299932 A1* | 12/2008 | Belogolovy et al. | 455/296 |
| 2009/0023411 A1* | 1/2009 | Katsube et al. | 455/307 |
| 2009/0135973 A1* | 5/2009 | He | 375/350 |
| 2009/0197554 A1* | 8/2009 | Shi et al. | 455/226.2 |
| 2009/0275305 A1* | 11/2009 | Russell et al. | 455/339 |

FOREIGN PATENT DOCUMENTS

| | | |
|---|---|---|
| JP | 2003-243088 | 10/1991 |
| JP | 2005-304485 | 11/1993 |
| JP | 2000-295304 | 10/2000 |

* cited by examiner

SYSTEM AND METHOD FOR ADJACENT CHANNEL POWER DETECTION AND DYNAMIC BANDWIDTH FILTER CONTROL

BACKGROUND

Portable communication devices, such as cellular telephones, personal digital assistants (PDAs) and other communication devices often include multiple radio receivers or transceivers. For example, a cellular telephone may include a cellular transceiver, a television receiver and an FM radio. A significant challenge of a radio receiver design is that the receiver must perform adequately in the presence of adjacent channel interference (ACI) or other nearby channel interferences, such as alternate channel interference. Adjacent channel interference refers to RF energy that is present in the channels that are adjacent to the desired receive channel to interfere with the desired receive signal.

The presence of strong adjacent channel interference or other nearby channel interferences can result in significant energy spilling over into the desired receive channel. This degrades the signal to interferer ratio and the signal to noise ratio of the receiver, and thus degrades the performance of the receiver. One possible solution is to filter the received signal using a channel filter having a narrow bandwidth. A narrow bandwidth channel filter provides significant reduction of adjacent channel interference, but also attenuates the desired receive signal.

In the case of an FM radio receiver, a narrow bandwidth channel filter attenuates the stereo FM signal, which causes harmonic distortion and degrades channel separation in the audio. Therefore, it is desirable to minimize adjacent and nearby channel interference while maximizing the strength of the desired signal.

SUMMARY

Embodiments of the invention include a system for detecting and minimizing interference in a radio receiver. In an embodiment, the system includes a plurality of bandpass filters having different response characteristics, a power detector configured to compare a power output of a first bandpass filter and a second bandpass filter, and logic to cascade a third bandpass filter when the difference in power output between the power output of the first bandpass filter and the power output of the second bandpass filter exceeds a threshold amount.

Other embodiments are also provided. Other systems, methods, features, and advantages of the invention will be or become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE FIGURES

The invention can be better understood with reference to the following figures. The components within the figures are not necessarily to scale, emphasis instead being placed upon clearly illustrating the principles of the invention. Moreover, in the figures, like reference numerals designate corresponding parts throughout the different views.

DETAILED DESCRIPTION

Figure 1:
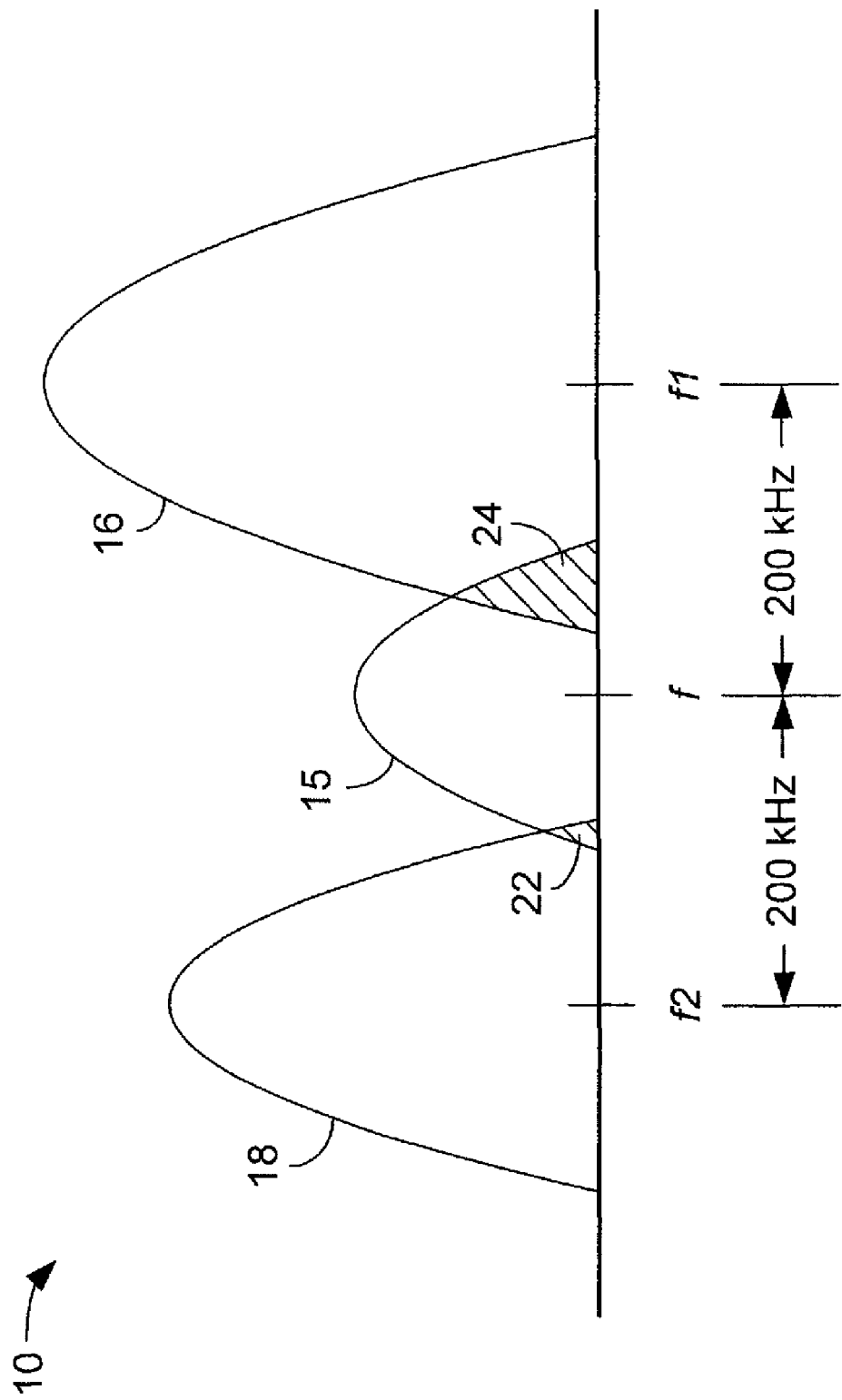
FIG. 1 is a schematic diagram illustrating a portion of the power spectrum that includes FM radio.

Although described with particular reference to a portable transceiver incorporating an FM radio receiver, the system and method for adjacent channel power detection and dynamic bandwidth filter control (also referred to below as a switchable bandwidth channel filter) can be implemented in any receiver in which it is desirable to detect and minimize adjacent channel interference.

The system and method for adjacent channel power detection and dynamic bandwidth filter control can be implemented in hardware, software, or a combination of hardware and software. When implemented in hardware, the system and method for adjacent channel power detection and dynamic bandwidth filter control can be implemented using specialized hardware elements and logic. When the system and method for adjacent channel power detection and dynamic bandwidth filter control is implemented partially in software, the software portion can be used to precisely control the various components in a channel filter associated with a receiver. The software can be stored in a memory and executed by a suitable instruction execution system (microprocessor). The hardware implementation of the system and method for adjacent channel power detection and dynamic bandwidth filter control can include any or a combination of the following technologies, which are all well known in the art: discrete electronic components, a discrete logic circuit(s) having logic gates for implementing logic functions upon data signals, an application specific integrated circuit having appropriate logic gates, a programmable gate array(s) (PGA), a field programmable gate array (FPGA), etc.

The software for the system and method for adjacent channel power detection and dynamic bandwidth filter control comprises an ordered listing of executable instructions for implementing logical functions, and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM), a read-only memory (ROM), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance, optical scanning of the paper or other medium, then compiled, interpreted or otherwise processed in a suitable manner if necessary, and then stored in a computer memory.

FIG. 1 is a schematic diagram 10 illustrating a portion of the power spectrum that includes FM radio. The radio spectrum generally includes a desired signal 15 and two adjacent channel interfering signals 16 and 18. In the example shown in FIG. 1, the desired signal 15 is separated from the adjacent channel signals 16 and 18 by aproximately 200 kilohertz (kHz). In the example shown in FIG. 1, the FM radio spectrum occupies a region of the electromagnetic spectrum from 78 MHz to 106 MHz. The desired signal 15 and the interfering signals 16 and 18 represent a small portion of the complete FM radio spectrum. The separation of 200 kHz is common to the FM radio receive spectrum and is used as an example only. The desired channel can be separated from other desired channels by amounts other than 200 kHz.

As shown in FIG. 1, the adjacent channel interfering signal 16 and the adjacent channel interfering signal 18 each overlap (also referred to as spillover) the desired signal 15. In this example, the adjacent channel interfering signal 16 and the adjacent channel interfering signal 18 overlap the desired signal by different amounts, but this is not necessarily the case. The adjacent channel interfering signal 16 overlaps the desired signal 15 in the region shown using reference numeral 24 and the adjacent channel interfering signal 18 overlaps the desired signal 15 in the region shown using reference numeral 22. Adjacent channel interference spillover into the desired signal 15 is unpredictable, and therefore, it is desirable to be able to detect whether energy in an adjacent channel, or in other nearby channels, is sufficiently close to the desired signal so as to have significant interfering energy in the region occupied by the desired signal 15. Further, if significant interfering energy is detected in the desired signal band, then it is desirable to eliminate the interfering energy. Because most of the signal energy in the desired signal is located close to the center of the channel, referred to as f, it is possible to remove even close-in adjacent channel energy, such as that shown in regions 22 and 24, without losing an unacceptably high amount of the desired signal energy.

A narrow bandwidth channel select filter can attenuate and substantially remove adjacent channel interference, such as the signal shown in regions 22 and 24. However, there are instances where a less-narrow bandwidth filter may be sufficient. As will be described below, an adjacent channel interference detector and a switchable bandwidth channel select filter can be implemented to provide only the attenuation desired to remove adjacent channel interference while minimizing attenuation of the desired signal.

Figure 2:
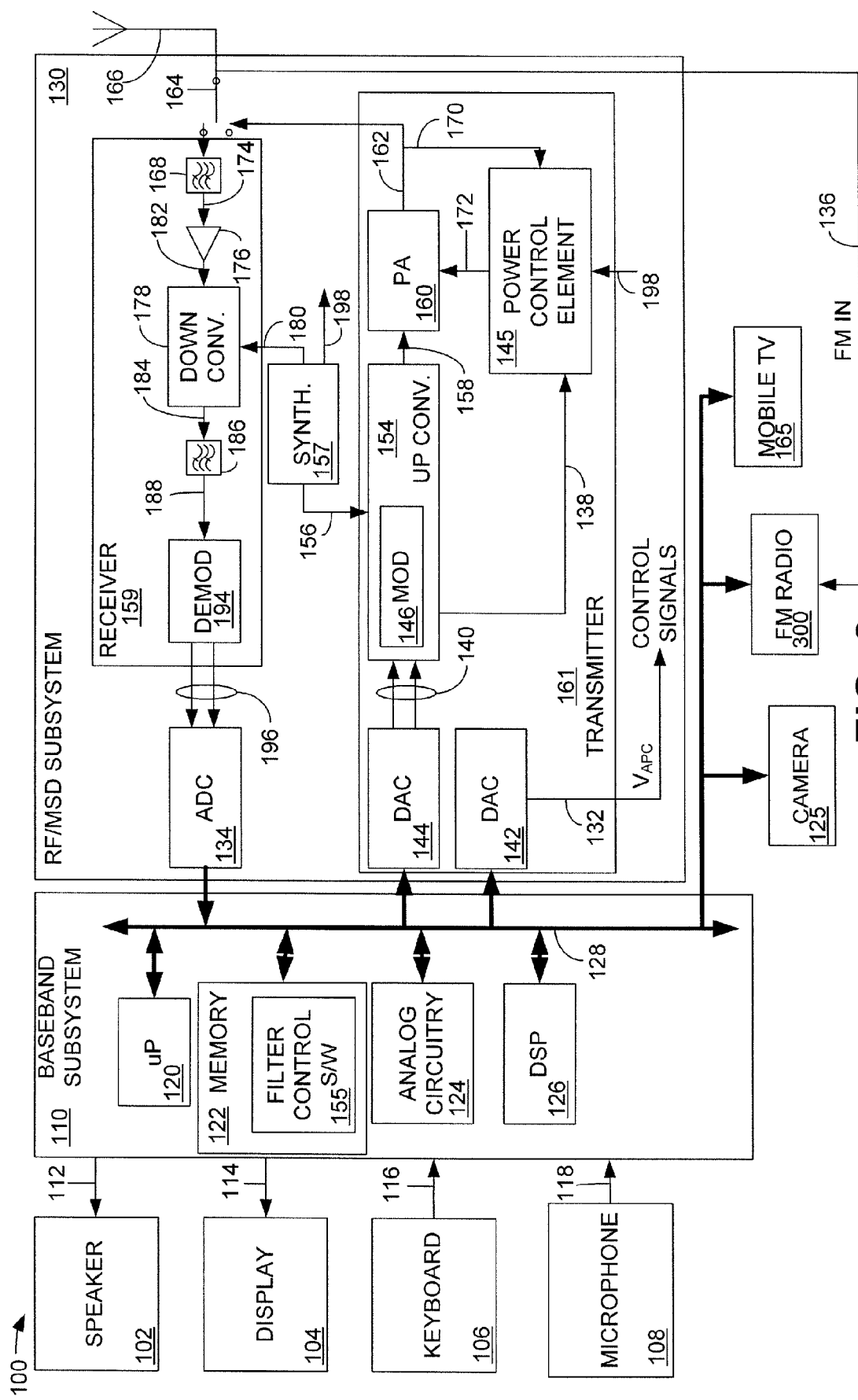
FIG. 2 is a block diagram illustrating a simplified portable transceiver.

FIG. 2 is a block diagram illustrating a simplified portable transceiver 100. The portable transceiver 100 includes speaker 102, display 104, keyboard 106, and microphone 108, all connected to baseband subsystem 110. In a particular embodiment, the portable transceiver 100 can be, for example but not limited to, a portable telecommunication handset such as a mobile cellular-type telephone. The speaker 102 and the display 104 receive signals from the baseband subsystem 110 via connections 112 and 114, respectively, as known to those skilled in the art. Similarly, the keyboard 106 and the microphone 108 supply signals to the baseband subsystem 110 via connections 116 and 118, respectively. The baseband subsystem 110 includes microprocessor (μP) 120, memory 122, analog circuitry 124, and digital signal processor (DSP) 126 in communication via bus 128. The bus 128, though shown as a single connection, may be implemented using a number of busses connected as necessary among the subsystems within baseband subsystem 110. The microprocessor 120 and the memory 122 provide the signal timing, processing and storage functions for the portable transceiver 100. If portions of the system and method for adjacent channel power detection and dynamic bandwidth filter control are implemented in software, then the memory 122 also includes filter control software 155 that can be executed by the microprocessor 120, the DSP 126 or by another processor to control the operation of the switchable bandwidth channel select filter to be described below.

The analog circuitry 124 provides the analog processing functions for the signals within the baseband subsystem 110. The baseband subsystem 110 communicates with the radio frequency (RF)/mixed signal device (MSD) subsystem 130 via the bus 128.

The portable transceiver 100 also includes, for example, a camera 125, a mobile TV receiver 165 and an FM radio 300. In this example, the FM radio 300 includes a receiver that includes a switchable bandwidth channel select filter, which will be described below.

The RF/MSD subsystem 130 includes both analog and digital components. Generally, the RF/MSD subsystem 130 includes a receiver 159, a synthesizer 157 and a transmitter 161. In this example, the RF/MSD subsystem 130 includes an analog-to-digital converter 134, and the transmitter 400 includes one or more digital-to-analog converters (DACS) 142 and 144.

In one embodiment, the baseband subsystem 110 provides an automatic power control signal (supplied as an analog voltage signal and referred to as $V_{APC}$) to the RF/MSD subsystem 130. Although shown as a single connection 132, the control signals may originate from the DSP 126 from the microprocessor 120, or from another element, and are supplied to a variety of points within the RF/MSD subsystem 130 by the DAC 142. It should be noted that, for simplicity, only the basic components of portable transceiver 100 are illustrated.

The ADC 134, the DAC 142 and the DAC 144 also communicate with microprocessor 120, memory 122, analog circuitry 124 and DSP 126 via bus 128. The DAC 144 converts the digital communication information within baseband subsystem 110 into an analog signal for transmission by the transmitter 161 via connection 140. Connection 140, while shown as two directed arrows, includes the information that is to be transmitted by RF/MSD subsystem 130 after conversion from the digital domain to the analog domain.

The DAC 144 may operate on either baseband in-phase (I) and quadrature-phase (Q) components or phase and amplitude components of the information signal. In the case of I and Q signals, the modulator 146 is an I/Q modulator as known in the art while in the case of phase and amplitude components, the modulator 146 operates as a phase modulator utilizing only the phase component and passes the amplitude component, unchanged, to the power control element 145. The DAC 142 supplies various other a control signals to various components within the RF/MSD subsystem 130 via connection 132.

The modulator 146 modulates either the I and Q information signals or the phase information signal received from the DAC 144 onto a frequency reference signal referred to as a "local oscillator" or "LO" signal provided by the synthesizer 157 via connection 156. In this example, the modulator 146 is part of the upconverter 154, but need not be.

The modulator 146 also supplies an intermediate frequency (IF) signal containing only the desired amplitude modulated (AM) signal component on connection 138 for input to the power control element 145 via connection 138. The AM signal supplied by the modulator via connection 138 is first supplied to a reference variable gain element associated with the RF/MSD subsystem 130. The AM signal supplied by the modulator 146 is an intermediate frequency (IF) AM signal with a constant (average) power level that is supplied as a reference signal to the reference variable gain element.

The synthesizer 157 determines the appropriate frequency to which the upconverter 154 will translate the modulated signal.

The upconverter 154 supplies a modulated signal at the appropriate transmit frequency via connection 158 to the power amplifier 160. The power amplifier 160 amplifies the modulated signal on connection 158 to the appropriate power level for transmission via connection 162 and switch 164 to antenna 166. Illustratively, switch 164 controls whether the amplified signal on connection 162 is transferred to antenna 166 or whether a received signal from antenna 166 is supplied to receive filter 168. The operation of switch 164 is controlled by a control signal from baseband subsystem 110 via connection 132.

In one embodiment, a portion of the amplified transmit signal power on connection 162 can be supplied via connection 170 to power control element 145. In this embodiment, the power control element 145 forms a continuous closed power control feedback loop and supplies an information signal on connection 172 instructing the power amplifier 160 as to the power to which the signal on connection 158 should be amplified. The power control element 145 also receives an LO signal from the synthesizer 157 via connection 198.

A signal received by antenna 166 may, at the appropriate time determined by baseband subsystem 110, be directed via switch 164 to a receive filter 168. FM radio signals are directed from the antenna 166 via connection 136 to the FM radio 300. The operation of the FM radio 300 will be described below.

The receive filter 168 filters the received signal and supplies the filtered signal on connection 174 to a low noise amplifier (LNA) 176. Although a single LNA 176 is shown in FIG. 1, it is understood that a plurality of LNAs are typically used, depending on the frequency or frequencies on which the portable transceiver 100 operates. The receive filter 168 may be a bandpass filter that passes all channels of the particular cellular system where the portable transceiver 100 is operating. As an example, for a 900 MHz GSM system, receive filter 168 would pass all frequencies from 925.1 MHz to 959.9 MHz, covering all 175 contiguous channels of 200 kHz each. The purpose of the receive filter 168 is to reject all frequencies outside the desired region. The LNA 176 amplifies the very weak signal on connection 174 to a level at which downconverter 178 can translate the signal from the transmitted frequency back to a baseband frequency. Alternatively, the functionality of the LNA 176 and the downconverter 178 can be accomplished using other elements, such as, for example but not limited to, a low noise block downconverter (LNB). In this example, the receiver 159 operates as a direct conversion receiver (DCR) in which the received RF signal is downconverted directly to a baseband signal.

The downconverter 178 receives one or more LO signals from synthesizer 157 via connection 180. The synthesizer 157 determines the frequency to which to downconvert the signal received from the LNA 176 via connection 182. In the case of a DCR, the received signal is converted directly to baseband (DC), or near-baseband. The downconverter 178 sends the downconverted signal via connection 184 to a channel filter 186, also called an "IF filter." The channel filter 186 selects the one desired channel and rejects all others. Using the GSM system as an example, only one of the 175 contiguous channels is actually to be received. After all channels are passed by the receive filter 168 and downconverted in frequency by the downconverter 178, only the one desired channel will appear precisely at the center frequency of channel filter 186. The synthesizer 157, by controlling the local oscillator frequency supplied on connection 180 to downconverter 178, determines the selected channel. The demodulator 194 recovers the transmitted analog information and supplies a signal representing this information via connection 196 to the ADC 134. The ADC 134 converts these analog signals to a digital signal at baseband frequency and transfers it via bus 128 to DSP 126 for further processing.

Figure 3:
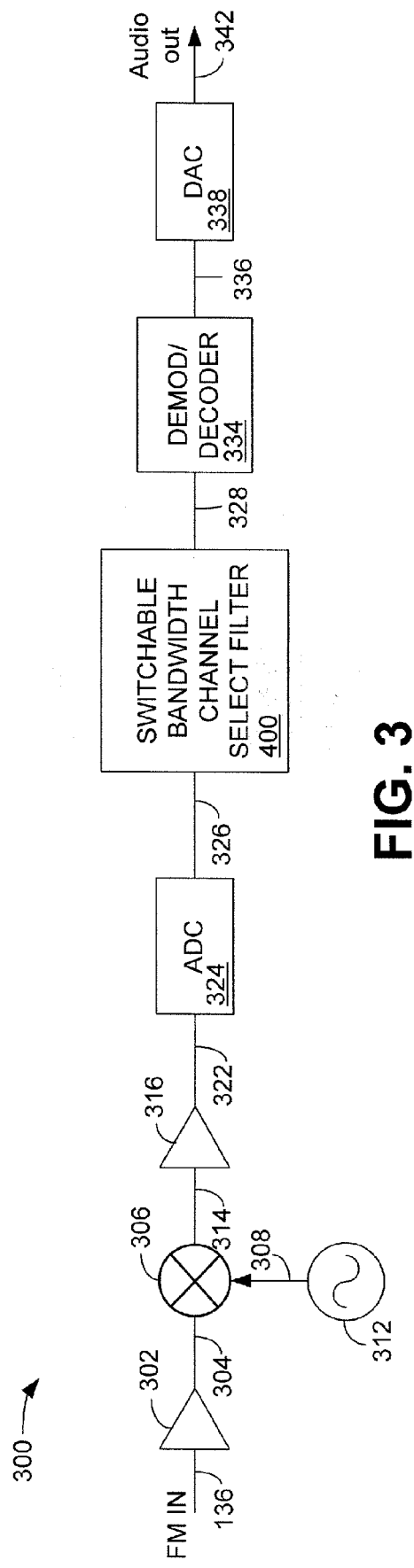
FIG. 3 is a schematic diagram illustrating the FM radio shown in FIG. 2.

FIG. 3 is a simplified schematic diagram illustrating the FM radio 300 shown in FIG. 2. Only the portions of an FM radio that are relevant to the explanation of the switchable bandwidth channel select filter are shown. The block diagram shown in FIG. 3 is a generic, simplified version of an FM radio. The actual implementation of the radio can be more complicated and consist of functional blocks in addition to the functional blocks shown in FIG. 3. The FM radio architecture can also differ from that shown in FIG. 3. The signals shown in FIG. 3 can also be either real signals or complex signals. In the case of complex signals, the signal paths can include an in-phase (I) path and a quadrature-phase (Q) path. Accordingly, the channel select filter to be described below can be either a real filter, a complex filter, or a combination of real and complex filters. In all cases, the switchable bandwidth channel select filter is applicable regardless of the actual architecture and the types of signals. The FM radio 300 includes a low noise amplifier (LNA) 302, which receives an FM radio input signal from the antenna 166 (FIG. 2), via connection 136. The output of the LNA 302 on connection 304 is supplied to a mixer 306. The mixer 306 receives a reference signal, also referred to as a local oscillator (LO) signal, via connection 308. The LO signal is supplied by an oscillator 312. The frequency of the LO signal on connection 308 determines the intermediate frequency to which the mixer 306 converts the signal on connection 304.

The output of the mixer 306 on connection 314 is an intermediate frequency (IF) signal and is supplied to an IF amplifier 316. The IF amplifier may be implemented as a series of IF amplifiers and is shown as a single amplifier for simplicity. The IF amplifier 316 amplifies the signal on connection 314 and supplies the amplified IF signal on connection 322. The gain of the IF amplifier 316 is controlled by an automatic-gain-control (AGC) circuit (not shown). The amplified IF signal on connection 322 is supplied to an analog to digital converter (ADC) 324. The ADC 324 converts the analog IF signal on connection 322 to a digital signal on connection 326. The digital IF signal on connection 326 is then supplied to a switchable bandwidth channel select filter 400. The structure and operation of the switchable bandwidth channel select filter 400 will be described in greater detail below. The switchable bandwidth channel select filter 400 operates on the IF signal on connection 326 to detect and remove adjacent or alternate channel interference from the desired to FM radio signal.

The output of the switchable bandwidth channel select filter 400 is supplied via connection 328 to a demodulator/decoder 334. The demodulator/decoder 334 extracts the information from the IF signal output of the switchable bandwidth channel select filter 400 and supplies its output via connection 336. The signal on connection 336 is supplied to a digital to analog converter (DAC) 338. The DAC 338 converts the digital signal on connection 336 to an analog audio signal and provides the analog audio signal as an audio output on connection 342. The audio output on connection 342 is then supplied to appropriate processing elements within the portable transceiver 100, so that FM radio can be provided to a user.

Figure 4:
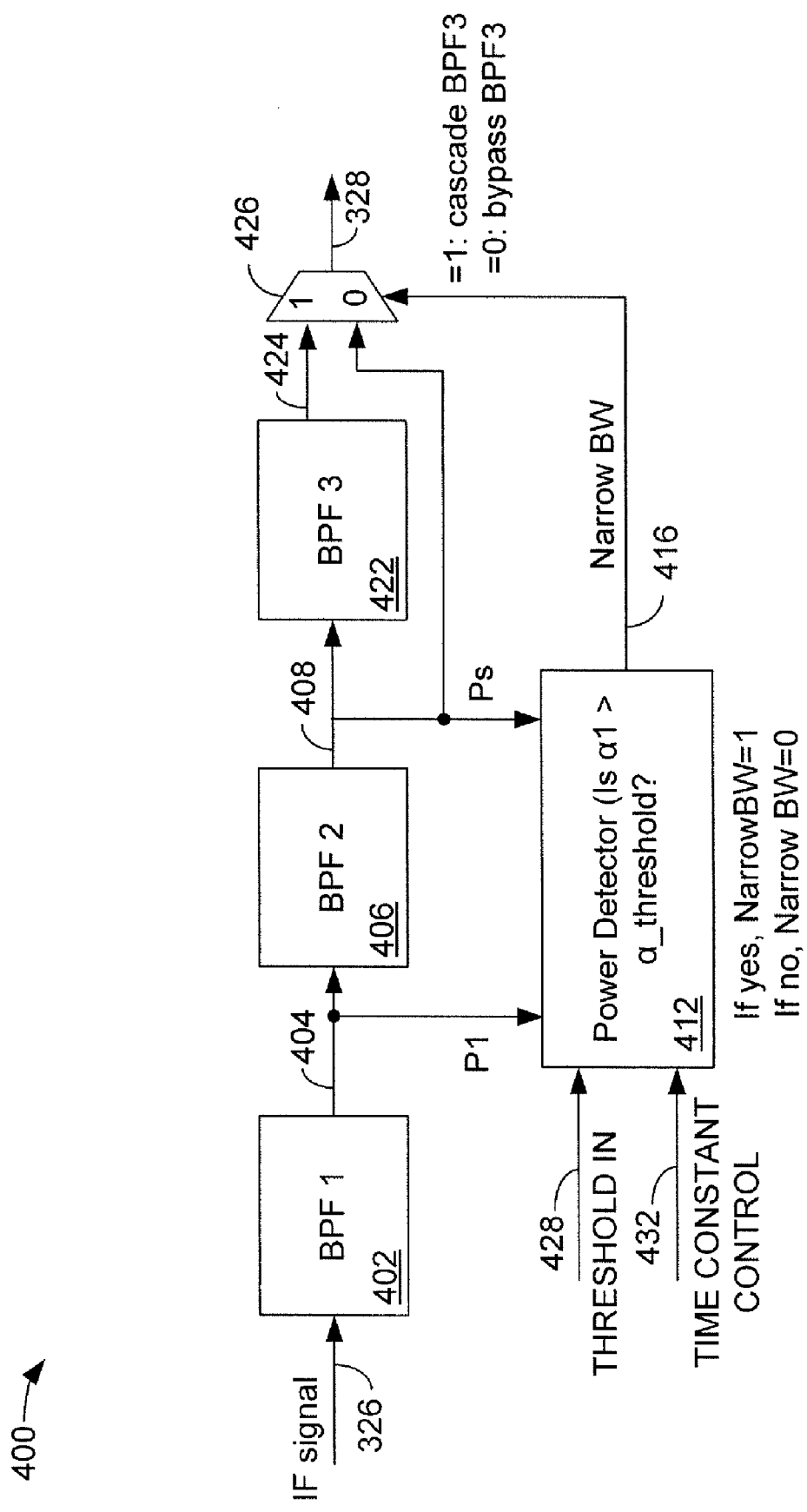
FIG. 4 is a schematic diagram illustrating an embodiment of the switchable bandwidth channel select filter of FIG. 3.

FIG. 4 is a schematic diagram illustrating an embodiment of the switchable bandwidth channel select filter of FIG. 3. The switchable bandwidth channel select filter 400 includes a first bandpass filter 402, a second bandpass filter 406 and a third bandpass filter 422. The switchable bandwidth channel select filter 400 also includes a power detector 412 and a multiplexer (MUX) 426. However, the power detector 412 and the MUX 426 may be implemented separate from the bandpass filters 402, 406 and 422.

Figure 5:
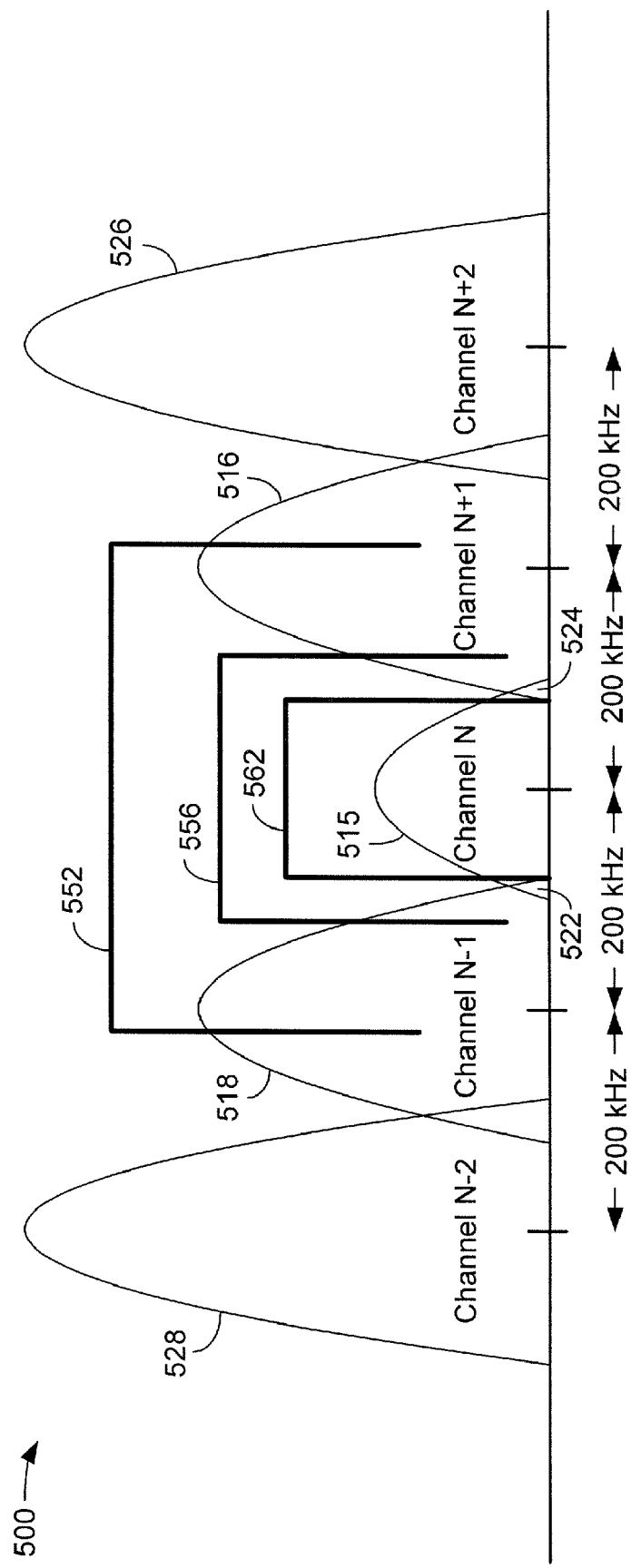
FIG. 5 is a schematic diagram illustrating the bandwidth of each bandpass filter of FIG. 4, relative to the channel spacing.

FIG. 5 is a schematic diagram illustrating the bandwidth of each bandpass filter of FIG. 4, relative to the channel spacing, which in this example is nominally 200 kHz. In FIG. 5, the power spectrum of the input IF signal includes the desired signal in channel 515 (channel N), two adjacent channel interfering signals in channels 516 and 518 (channels N+1 and N−1, respectively), and two alternate channel interfering signals in channels 526 and 528 (channels N+2 and N−2, respectively). The frequency responses of the bandpass filters 402, 406 and 422 are shown using traces 552, 556 and 562, respectively. The amplitudes of these frequency response curves are arbitrary and not to scale. The bandwidth of the first bandpass filter 402 (BPF 1, trace 552) is about two (2) times the channel bandwidth, or spacing, which is nominally 200 kHz in this example. The bandwidth of the second bandpass filter 406 (BPF 2, trace 556) is about equal to the channel bandwidth, or spacing. The bandwidth of the third bandpass filter 422 (BPF 3, trace 562) is set lower than one channel bandwidth, so that any spillover from the adjacent channel interfering signals into the desired channel can be significantly removed. As shown in FIG. 5, the bandpass filter 422 (trace 562) removes any spillover in the regions 522 and 524 while leaving a significant amount of desired signal energy in the channel 515.

Referring again to FIG. 4, the intermediate frequency FM input signal on connection 326 is supplied to the first bandpass filter 402. The first bandpass filter 402 filters the FM input signal on connection 326 to remove all but the desired signal and a portion of the energy in the adjacent channels. In this example, the first bandpass filter 402 removes approximately one half of the adjacent channel energy, but this need not be the case. The characteristics of the bandpass filters can be designed based on a desired implementation. The output of the bandpass filter 402 on connection 404 represents the desired signal and approximately one half of the energy of the channels that are adjacent to the desired signal.

The output of the first bandpass filter 402 is supplied via connection 404 to the second bandpass filter 406. The second bandpass filter 406, having a bandwidth equaling approximately one channel bandwidth in this example, filters the signal on connection 404 to remove the adjacent channel signal energy. However, it does not remove the spillover energy that is inside the desired signal channel 515 (FIG. 5) and shown in regions 522 and 524 of FIG. 5. Therefore, the output of the second bandpass filter 406 on connection 408 represents the desired signal and the spillover of the adjacent channel interfering signals into the desired channel 515 (FIG. 5).

The output of the first bandpass filter 402 on connection 404 and the output of the second bandpass filter 406 are also supplied to a power detector 412. The power on connection 404 is referred to as P1 and the power on connection 408 is referred to as Ps. The power detector measures P1 and Ps, and calculates the difference of P1-Ps. The difference, P1-Ps, represents one half of the power present in the adjacent channels (516 and 518 of FIG. 5). Thus, the power detector 412 can determine whether there is power present in the adjacent channels, and if so, the level of the adjacent channel power.

The power detector 412 also calculates the ratio of P1-Ps to Ps, or (P1-Ps)/Ps. This ratio represents the ratio of the power in the adjacent channel or channels to the power in the desired channel. This ratio is referred to as $\alpha 1$. A large value of $\alpha 1$ indicates large adjacent channel interference relative to the desired signal, which, in turn, suggests the energy spillover from adjacent-channel interfering signals to the desired channel is a significant portion of the desired signal. Under such a condition, additional filtering is desired. The power detector compares $\alpha 1$ to a predetermined threshold, $\alpha\_threshold$. If $\alpha 1$ exceeds $\alpha\_threshold$, then additional filtering is applied to further remove the energy of the adjacent channel interfering signal inside the desired channel (515 of FIG. 5).

The optimal value for $\alpha\_threshold$ can be determined based on system requirements, on the amount of adjacent channel interference that the system can tolerate, or on desired signal strength. If the system can tolerate more adjacent channel interference, then $\alpha\_threshold$ can be set at a larger value, and vice versa. The threshold value is pre-determined and stored within the power detector 412.

The output of the second bandpass filter 406 is supplied over connection 408 either to a third bandpass filter 422 or to a multiplexer 426. If the power detector 412 determines that sufficient power is present in the adjacent channels, (for example, if ($\alpha 1 > \alpha\_threshold$)) then the power detector 412 provides a logic high signal via connection 416 to the multiplexer 426. If the power detector 412 determines that little or no power is present in one or more adjacent or alternate channels, (i.e., if ($\alpha 1 < \alpha\_threshold$)) then the power detector 412 provides a logic low signal via connection 416 to the multiplexer 426. If $\alpha 1 = \alpha\_threshold$, then, using hysterisis as described below, the switchable bandwidth channel select filter retains the existing mode.

A logic high signal supplied to the multiplexer 426 causes the multiplexer 426 to choose the output of the third bandpass filter 422 on connection 424. This mode is referred to as the narrow bandwidth mode. Stated another way, the third bandpass filter 422 is implemented only when there is sufficient energy present in the channels adjacent to the desired channel and greater than the threshold $\alpha\_threshold$. The bandwidth of the third bandpass filter 422 is less than a channel bandwidth, therefore it can remove the spillover energy from the adjacent channel interfering signal or signals.

If the power detector 412 determines that the energy present in the channels adjacent to the desired channel is below the threshold, then the power detector 412 provides a logic low signal on connection 416 to the multiplexer 426. A logic low signal on connection 416 causes the multiplexer 426 to select the output of the second bandpass filter 406 on connection 408 and bypass the third bandpass filter 422. This mode is referred to as the nominal bandwidth mode. In this manner, the third, and significantly narrower, bandpass filter 422 is implemented only if there is sufficient energy present in the channels adjacent to the channel in which the desired signal is located.

The power detector and the dynamic bandwidth switching operate with a time constant control supplied via connection 432. The time constant control sets the minimum time duration between two bandwidth switching events. The optimal value for the minimum time duration depends on system requirements and can be pre-determined based on system specifications.

It is often desirable to add hysterisis to the dynamic bandwidth switching. Adding hysterisis prevents the bandwidth switching from "chattering" when the difference between $\alpha 1$ and $\alpha$_threshold are smaller than the resolution of the power detector 412. "Chattering" is often undesirable as it adds noise. One way of adding hysterisis is to use a smaller value of $\alpha$_threshold for switching from narrow bandwidth mode to nominal bandwidth mode, and a larger value of $\alpha$_threshold for switching from nominal bandwidth mode to narrow bandwidth mode.

In an embodiment, and using the FM radio spectrum with 200 kHz channel spacing as an example, the first bandpass filter 402 is a 6th order infinite impulse response (IIR) filter having a bandwidth of approximately 400 kHz. The second bandpass filter 406 is a finite impulse response (FIR) filter having 17 taps and a bandwidth of approximately 180 kHz. The third bandpass filter 422 is also a finite impulse response (FIR) filter having 17 taps and a bandwidth of approximately 90 kHz. The approximate 400 kHz bandwidth of the first bandpass filter 402 represents approximately two channel bandwidths in this example. The 180 kHz bandwidth of the second bandpass filter 406 represents approximately one channel bandwidth in this example. The bandwidth of the third bandpass filter 422 is approximately 90 kHz and is narrower than one channel bandwidth in this example.

A Cascading the third bandpass filter 422 results in a switchable bandwidth channel select filter 400 having a very narrow bandwidth and improves rejection of adjacent channel interference. However if the ratio of the power output of the first bandpass filter 402 to the output of the second bandpass filter 406 is lower than the threshold, then the third bandpass filter 422 is bypassed, resulting in an overall nominal filter bandwidth that includes the cascaded first and second bandpass filters 402 and 406. This allows the FM radio to operate in stereo mode with low distortion and good stereo channel separation when there is little or no adjacent channel interference. The filter bandwidth switching operates with a time constant and hysteresis control. In addition to the capability of detecting adjacent channel interference, the switchable bandwidth channel select filter 400 achieves superior overall filter performance without an increase in an area because the bandpass filters 402, 406 and 422 are connected in series and can be independently and separately optimized.

The adjacent channel interference detection provided by the power detector 412 does not interrupt the normal operation of the FM radio or the portable transceiver 100. Power located in a channel adjacent to the desired channel is measured in real-time, regardless of whether the bandwidth of the switchable bandwidth channel select filter is in the narrow (all filters cascaded) or the nominal setting (bandpass filters 402 and 406 cascaded). In addition, adjacent channel power is measured at an intermediate frequency, before the intermediate frequency signal is demodulated. Accordingly, adjacent channel power can be detected and also measured very accurately.

Furthermore, the cascaded bandpass filter structure not only allows measurement of adjacent channel interference, but also allows implementation of desirable filter characteristics at a low cost. Because the bandpass filters are connected in series, they all contribute to the frequency response of the overall switchable bandwidth channel select filter 400. Therefore, sophisticated filter characteristics can be achieved with relatively simple filters. Because each filter can be optimized separately, the switchable bandwidth channel select filter 400 can achieve high overall filter performance given a particular die area. While three bandpass filters are described, a different number of bandpass filters can be implemented, depending on desired system performance and other factors.

Figure 6:
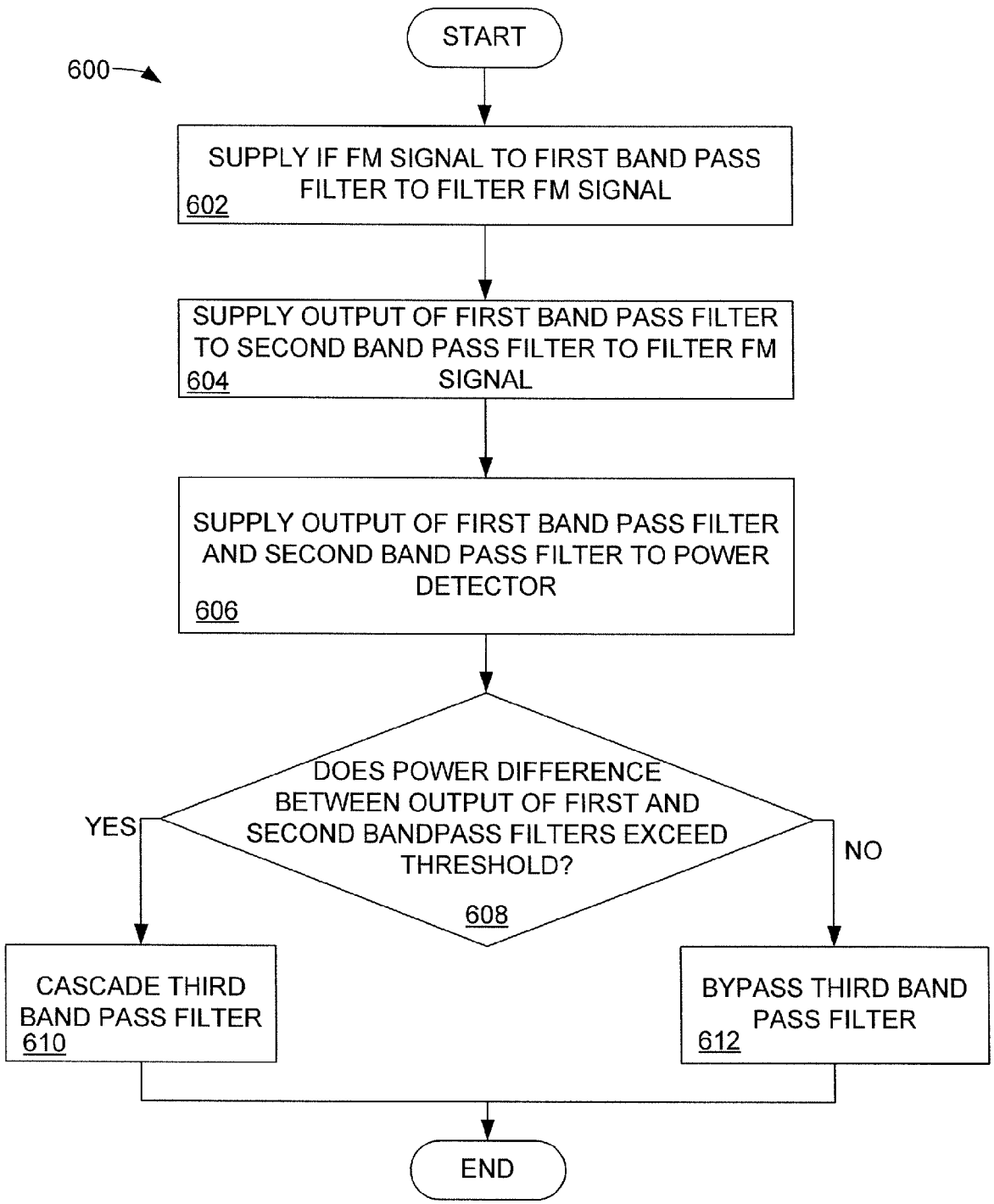
FIG. 6 is a flow chart describing the operation of an embodiment of the switchable bandwidth channel select filter of FIG. 4.

FIG. 6 is a flow chart 600 describing the operation of an embodiment of the switchable bandwidth channel select filter of FIG. 4. The blocks in the flowchart can be performed in or out of the order shown by the elements described above, or can be performed by different elements. In block 602, the intermediate frequency (IF) FM signal is supplied to the first bandpass filter 402 (FIG. 4). The first bandpass filter 402 filters the FM signal to remove all signal components except the desired signal and signals that occupy the adjacent channels.

In block 604 the output of the first bandpass filter 402 is supplied to a second bandpass filter 406. The second bandpass filter 406 filters the FM signal to remove approximately one half of any energy present in the channels that are adjacent to the desired signal. In block 606 the output of the first bandpass filter 402 and the output of the second bandpass filter 406 are supplied to a power detector 412.

In block 608 it is determined whether the power difference between the output of the first bandpass filter 402 and the output of the second bandpass filter 406 exceeds a threshold. If the difference in power between the output of the first bandpass filter 402 and the second bandpass filter 406 exceeds the threshold, then, sufficient adjacent channel power is indicated. If sufficient adjacent channel power is indicated, then, in block 610, the third bandpass filter 422 is cascaded with the first and second bandpass filters, 402 and 406, respectively, to provide an overall narrowband filter. The narrowband filter characteristic eliminates energy in the regions of the adjacent channel that are close to the desired signal.

If, in block 608, it is determined that the difference in power between the output of the first bandpass filter 402 and the output of the second bandpass filter 406 does not exceed the threshold, then, in block 612, the third bandpass filter 422 is bypassed, thus allowing adequate signal filtering while maximizing the energy in the desired signal.

Figure 7:
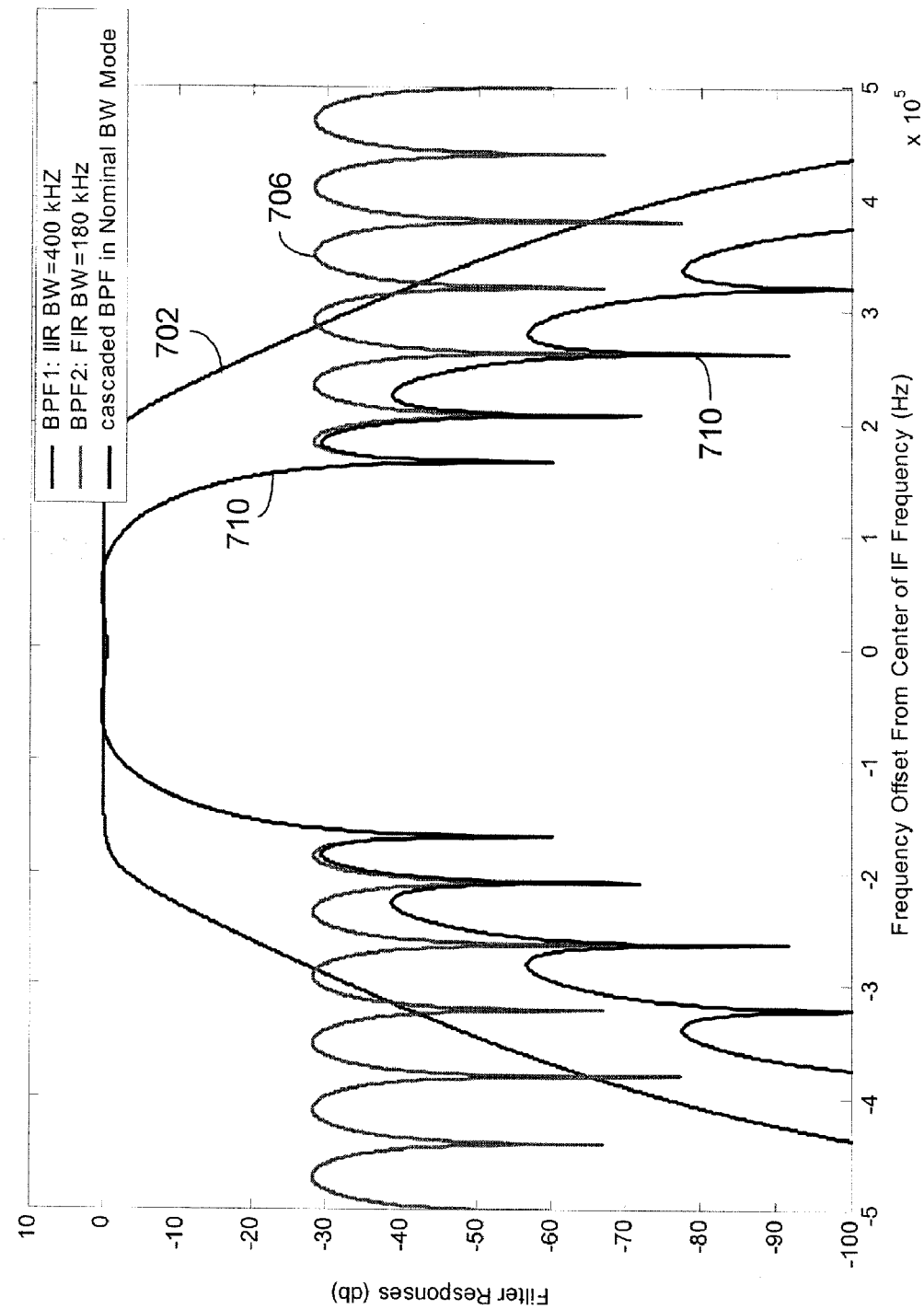
FIG. 7 is a graphical representation showing a nominal bandwidth frequency response of the switchable bandwidth channel select filter.

FIG. 7 is a graphical representation 700 showing a nominal bandwidth frequency response of the switchable bandwidth channel select filter 400. In FIG. 7 only the first bandpass filter 402 and the second bandpass filter 406 are implemented.

The trace 702 corresponds to the first bandpass filter 402 and the trace 706 corresponds to the second bandpass filter 406. The trace 710 corresponds to the cascaded first and second bandpass filters 402 and 406, and corresponds to the output on connection 408 (FIG. 4).

Figure 8:
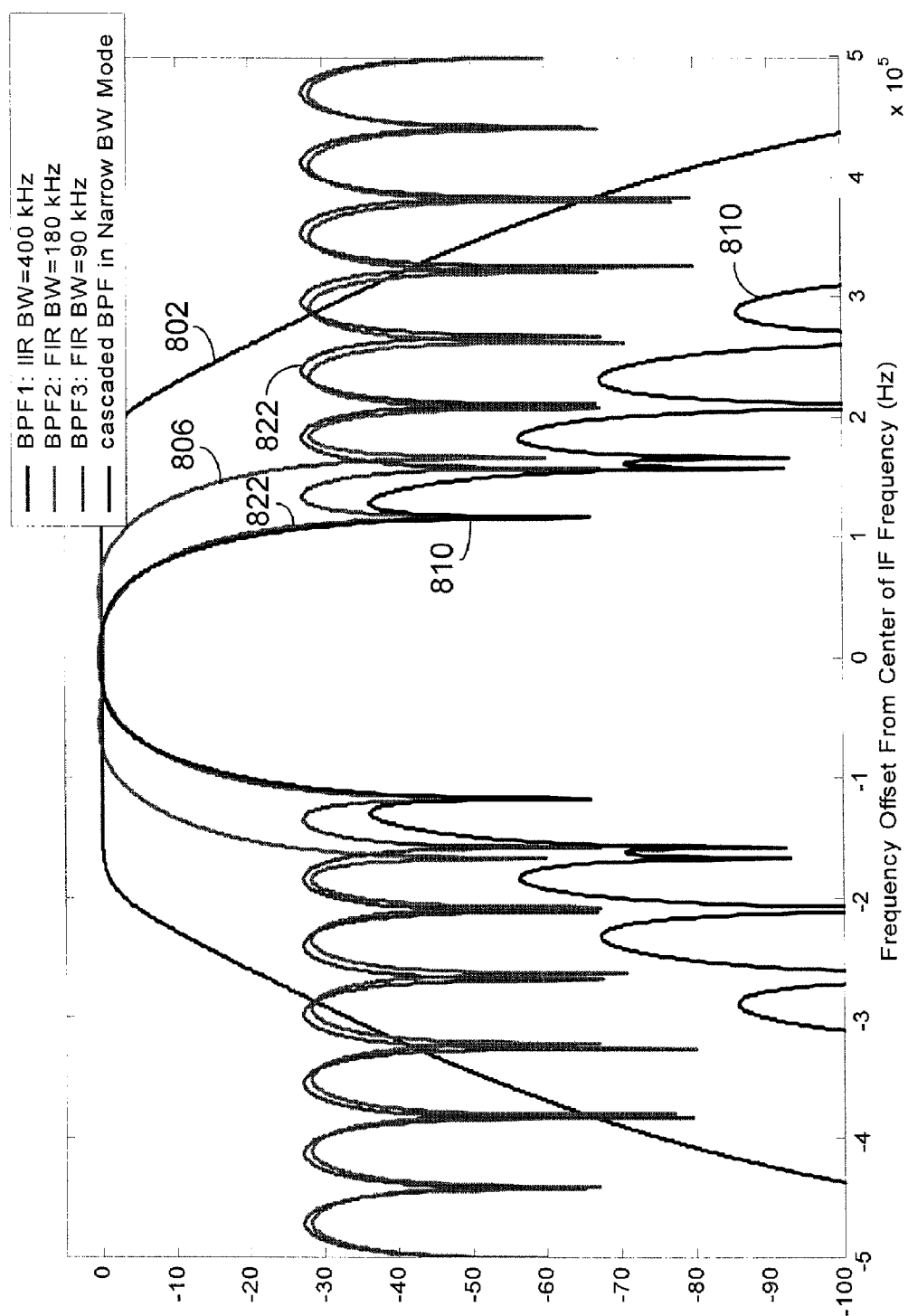
FIG. 8 is a graphical representation showing a narrow bandwidth frequency response of the switchable bandwidth channel select filter.

FIG. 8 is a graphical representation 800 showing a narrow bandwidth frequency response of the switchable bandwidth channel select filter 400. In FIG. 8 the first, second and third bandpass filters are all implemented. The trace 802 corresponds to the first bandpass filter 402, the trace 806 corresponds to the second bandpass filter 406 and the trace 822 corresponds to the third bandpass filter 422. The trace 810 corresponds to the cascaded first, second and third bandpass filters 402, 406, and 422, and corresponds to the output on connection 424 (FIG. 4).

While various embodiments of the invention have been described, it will be apparent to those of ordinary skill in the art that many more embodiments and implementations are possible that are within the scope of the invention. The invention is not limited to a specific type of bandpass filter. For example, the bandpass filters can be digital or analog filters, real or complex filters, finite impulse response (FIR) or infinite impulse response (IIR) filters. Embodiments of the invention are applicable to different sections of a radio system, for example, the radio-frequency section, the intermediate-frequency section, or the baseband section. Embodiments of the invention are not limited to an RF system. Embodiments of the invention are applicable to other communication systems, where the detection and rejection of close-by interference is desirable.

What is claimed is:

1. A system for detecting and minimizing interference in a radio receiver, comprising:
    a plurality of bandpass filters comprising at least a first bandpass filter and a second bandpass filter, the first and second bandpass filters having different response characteristics, an output of the first bandpass filter coupled to an input of the second bandpass filter;
    a power detector configured to compare a power output of the first bandpass filter and a power output of the second bandpass filter; and
    logic to cascade a third bandpass filter having a different response characteristic from the first and second bandpass filters when the difference in power output between the power output of the first bandpass filter and the power output of the second bandpass filter exceeds a threshold amount, an input of the third bandpass filter being coupled to an output of the second bandpass filter when the third bandpass filter is cascaded.

2. The system of claim 1, in which the bandwidth of the second bandpass filter is narrower than the bandwidth of the first bandpass filter and the bandwidth of the third bandpass filter is narrower than the bandwidth of the second bandpass filter.

3. The system of claim 2, in which the difference in power output between the power output of the first bandpass filter and the power output of the second bandpass filter indicates the presence of interference in a channel adjacent to a desired channel.

4. The system of claim 1, in which an overall filter bandwidth is determined by the presence of power in at least one channel adjacent to a desired channel.

5. The system of claim 1, in which the power detector receives a time constant control signal.

6. The system of claim 1, in which the threshold amount is a function of a desired signal strength.

7. The system of claim 1, in which the bandwidth of the first bandpass filter is approximately two channel bandwidths, the bandwidth of the second bandpass filter is approximately one channel bandwidth and the bandwidth of the third bandpass filter is approximately less than one channel bandwidth.

8. A portable transceiver having a system for detecting and minimizing interference in a radio receiver, comprising:
    a transmitter operatively coupled to a receiver;
    an FM radio receiver comprising:
        a plurality of bandpass filters comprising at least a first bandpass filter and a second bandpass filter, the first and second bandpass filters having different response characteristics, an output of the first bandpass filter coupled to an input of the second bandpass filter;
        a power detector configured to compare a power output of the first bandpass filter and a power output of the second bandpass filter; and
        logic to cascade a third bandpass filter having a different response characteristic from the first and second bandpass filters when the difference in power output between the power output of the first bandpass filter and the power output of the second bandpass filter exceeds a threshold amount, an input of the third bandpass filter being coupled to an output of the second bandpass filter when the third bandpass filter is cascaded.

9. The transceiver of claim 8, in which the bandwidth of the second bandpass filter is narrower than the bandwidth of the first bandpass filter and the bandwidth of the third bandpass filter is narrower than the bandwidth of the second bandpass filter.

10. The transceiver of claim 9, in which the difference in power output between the power output of the first bandpass filter and the power output of the second bandpass filter indicates the presence of interference in a channel adjacent to a desired channel.

11. The transceiver of claim 8, in which an overall filter bandwidth is determined by the presence of power in at least one channel adjacent to a desired channel.

12. The transceiver of claim 11, in which the power detector receives a time constant control signal.

13. The transceiver of claim 9, in which the threshold amount is a function of a desired signal strength.

14. The transceiver of claim 8, in which the bandwidth of the first bandpass filter is approximately two channel bandwidths, the bandwidth of the second bandpass filter is approximately one channel bandwidth and the bandwidth of the third bandpass filter is approximately less than one channel bandwidth.

15. A method for detecting and minimizing interference in a radio receiver, comprising:
    filtering a receive signal using a first bandpass filter;
    filtering the output of the first bandpass filter using a second bandpass filter having a different response characteristic from a response characteristic of the first bandpass filter;
    comparing a power output of the first bandpass filter and the second bandpass filter; and
    filtering the output of the second bandpass filter using a third bandpass filter having a different response characteristic from the first and second bandpass filters when the difference in power output between the power output of the first bandpass filter and the power output of the second bandpass filter exceeds a threshold amount.

16. The method of claim 15, in which the bandwidth of the second bandpass filter is narrower than the bandwidth of the first bandpass filter and the bandwidth of the third bandpass filter is narrower than the bandwidth of the second bandpass filter.

17. The method transceiver of claim 16, in which the difference in power output between the power output of the first bandpass filter and the power output of the second bandpass filter indicates the presence of interference in a channel adjacent to a desired channel.

18. The method of claim 15, further comprising determining an overall filter bandwidth by the presence of power in at least one channel adjacent to a desired channel.

19. The method of claim 15, in which the comparing further comprising providing a time constant control signal.

20. The method of claim 15, in which the threshold amount is a function of a desired signal strength.

21. The method of claim 15, in which the bandwidth of the first bandpass filter is approximately two channel bandwidths, the bandwidth of the second bandpass filter is approximately one channel bandwidth and the bandwidth of the third bandpass filter is approximately less than one channel bandwidth.

* * * * *

UNITED STATES PATENT AND TRADEMARK OFFICE
CERTIFICATE OF CORRECTION

PATENT NO.       : 7,804,922 B2
APPLICATION NO.  : 11/681211
DATED            : September 28, 2010
INVENTOR(S)      : Ying Shi et al.

It is certified that error appears in the above-identified patent and that said Letters Patent is hereby corrected as shown below:

Column 12, line 47, in claim 17, line 1, please delete "transceiver".

Signed and Sealed this
Twenty-ninth Day of May, 2012

David J. Kappos
*Director of the United States Patent and Trademark Office*